(12) United States Patent
Ehman et al.

(10) Patent No.: US 10,367,252 B2
(45) Date of Patent: Jul. 30, 2019

(54) BROADBAND ANTENNA

(71) Applicant: Apple Inc., Cupertino, CA (US)

(72) Inventors: Rex T. Ehman, Santa Clara, CA (US);
Jayesh Nath, Milpitas, CA (US); Carlo Di Nallo, San Carlos, CA (US); James G. Horiuchi, Fremont, CA (US); Erik G. de Jong, San Francisco, CA (US); Jason C. Sauers, Cupertino, CA (US); Makiko K. Brzezinski, San Jose, CA (US); Siwen Yong, Santa Clara, CA (US); Lijun Zhang, San Jose, CA (US); Yi Jiang, Cupertino, CA (US); Zheyu Wang, Sunnyvale, CA (US); Mario Martinis, Cupertino, CA (US); Eduardo Da Costa Bras Lima, Sunnyvale, CA (US); Xu Han, San Jose, CA (US); Mattia Pascolini, San Francisco, CA (US); Trevor J. Ness, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 169 days.

(21) Appl. No.: 15/234,918

(22) Filed: Aug. 11, 2016

(65) Prior Publication Data
US 2018/0048058 A1 Feb. 15, 2018

(51) Int. Cl.
*H01Q 1/48* (2006.01)
*H01Q 1/27* (2006.01)
(Continued)

(52) U.S. Cl.
CPC .......... *H01Q 1/273* (2013.01); *H01Q 1/2291* (2013.01); *H01Q 1/243* (2013.01); *H01Q 1/48* (2013.01);
(Continued)

(58) Field of Classification Search
CPC ...... H01Q 1/273; H01Q 1/2291; H01Q 1/243; H01Q 1/48; H01Q 1/50; H01Q 7/00; H01Q 9/14
See application file for complete search history.

(56) References Cited

U.S. PATENT DOCUMENTS

| 8,432,322 B2 | 4/2013 | Amm et al. |
| 9,685,690 B2 | 6/2017 | Samardzija et al. |
| (Continued) | | |

FOREIGN PATENT DOCUMENTS

| CN | 101957456 A | 1/2011 |
| CN | 101958455 A | 1/2011 |
| (Continued) | | |

*Primary Examiner* — Graham P Smith
(74) *Attorney, Agent, or Firm* — Treyz Law Group, P.C.; G. Victor Treyz; Tianyi He

(57) ABSTRACT

An electronic device such as a wristwatch may have a housing with metal portions such as metal sidewalls. The housing may form an antenna ground for an antenna. An antenna resonating element for the antenna may be formed from a stack of capacitively coupled component layers such as a display layer, touch sensor layer, and near-field communications antenna layer at a front face of the device. An additional antenna may be formed from a peripheral resonating element that runs along a peripheral edge of the device and the antenna ground. A rear face antenna may be formed using a wireless power receiving coil as a radio-frequency antenna resonating element or may be formed from metal antenna traces on a plastic support for light-based components.

19 Claims, 16 Drawing Sheets

(51) Int. Cl.
*H01Q 1/22* (2006.01)
*H01Q 1/50* (2006.01)
*H01Q 9/04* (2006.01)
*H04B 5/00* (2006.01)
*H01Q 1/24* (2006.01)
*H01Q 7/00* (2006.01)
*H01Q 9/14* (2006.01)

(52) U.S. Cl.
CPC .............. *H01Q 1/50* (2013.01); *H01Q 7/00* (2013.01); *H01Q 9/0421* (2013.01); *H01Q 9/14* (2013.01); *H04B 5/0031* (2013.01)

(56) References Cited

U.S. PATENT DOCUMENTS

| | | | |
|---|---|---|---|
| 9,774,087 | B2 | 9/2017 | Chang et al. |
| 9,786,982 | B2 | 10/2017 | Lee et al. |
| 2004/0070538 | A1 | 4/2004 | Horie et al. |
| 2006/0227058 | A1 | 10/2006 | Zellweger et al. |
| 2011/0006953 | A1 | 1/2011 | Chiang et al. |
| 2011/0260939 | A1 | 10/2011 | Korva et al. |
| 2012/0154222 | A1 | 6/2012 | Oh et al. |
| 2012/0223865 | A1 | 9/2012 | Li et al. |
| 2013/0257659 | A1 | 10/2013 | Darnell et al. |
| 2015/0017978 | A1 | 1/2015 | Hong et al. |
| 2015/0130979 | A1 | 5/2015 | Huang et al. |
| 2015/0244063 | A1 | 8/2015 | Sowpati |
| 2015/0270046 | A1 | 9/2015 | Golko et al. |
| 2015/0311960 | A1 | 10/2015 | Samardzija et al. |
| 2016/0013543 | A1 | 1/2016 | Nguyen |
| 2016/0013544 | A1 | 1/2016 | Lyons et al. |
| 2016/0036120 | A1 | 2/2016 | Sepänniitty et al. |
| 2016/0054711 | A1 | 2/2016 | Fujisawa |
| 2016/0187857 | A1 | 6/2016 | Cho et al. |
| 2016/0261026 | A1* | 9/2016 | Han ............... H01Q 1/243 |

FOREIGN PATENT DOCUMENTS

| | | |
|---|---|---|
| CN | 102709684 A | 10/2012 |
| CN | 103199333 A | 7/2013 |
| CN | 103199882 A | 7/2013 |
| CN | 103348534 A | 10/2013 |
| CN | 204539638 U | 8/2015 |
| CN | 204720550 U | 10/2015 |
| CN | 204885412 U | 12/2015 |
| CN | 205004435 U | 1/2016 |
| CN | 105301954 A | 2/2016 |
| CN | 105552526 A | 5/2016 |
| CN | 105576370 A | 5/2016 |
| JP | 2005249737 | 9/2005 |
| JP | 5302411 B2 | 6/2013 |
| KR | 10-1284442 B1 | 7/2013 |
| KR | 10-2013-0133853 A | 12/2013 |
| KR | 10-2015-0141366 A | 12/2015 |
| KR | 101584555 B1 | 1/2016 |
| WO | 2015187348 | 12/2015 |

* cited by examiner

| MODE | SWITCHING STATE |
|---|---|
| M1 | $\left.\begin{array}{l}X \rightarrow A \\ Y \rightarrow B\end{array}\right\}$ IFA |
| M2 | $\left.\begin{array}{l}Y \rightarrow A \\ X \rightarrow B\end{array}\right\}$ IFA |
| M3 | $\left.\begin{array}{l}Y \rightarrow A \\ X \rightarrow C = GND \\ B = OPEN\end{array}\right\}$ MONOPOLE |

*FIG. 16*

BROADBAND ANTENNA

BACKGROUND

This relates to electronics devices, and more particularly, to antennas for electronic devices with wireless communications circuitry.

Electronic devices are often provided with wireless communications capabilities. To satisfy consumer demand for small form factor wireless devices, manufacturers are continually striving to implement wireless communications circuitry such as antenna components using compact structures. At the same time, there is a desire for wireless devices to cover a growing number of communications bands.

Because antennas have the potential to interfere with each other and with components in a wireless device, care must be taken when incorporating antennas into an electronic device. Moreover, care must be taken to ensure that the antennas and wireless circuitry in a device are able to exhibit satisfactory performance over a range of operating frequencies.

It would therefore be desirable to be able to provide improved wireless communications circuitry for wireless electronic devices.

SUMMARY

An electronic device such as a wristwatch may have a housing with metal portions such as metal sidewalls. A display may be mounted on a front face of the device. Light-based components such as light-emitting diodes and detectors may be mounted on a rear face of the device.

The housing may form an antenna ground. The antenna ground and an antenna resonating element may be used in forming an antenna at the front face of the device. The antenna resonating element may be formed from a stack of capacitively coupled component layers at the front face of the device. The stack of component layers may include the display layer, a touch sensor layer, and a near-field communications antenna layer.

A peripheral antenna may be formed from a peripheral resonating element that runs along a peripheral edge of the device and the antenna ground. The peripheral antenna may be used to handle wireless local area network signals.

A rear face antenna may be formed by using a wireless power receiving coil as a radio-frequency antenna resonating element for cellular telephone signals, or may be formed from metal antenna traces on a plastic support for the light-based components.

Cellular telephone signals may be transmitted and received using the antennas at the front and rear faces. Signals at frequencies above 960 MHz may be handled using the front face antenna, signals from 700-960 MHz may be handled using the rear face antenna, or these antennas may be used to handle signals at other frequencies.

BRIEF DESCRIPTION OF THE DRAWINGS

FIG. 16 is a table showing illustrative operating modes for the antenna of FIG. 15 in accordance with an embodiment.

DETAILED DESCRIPTION

Figure 1:
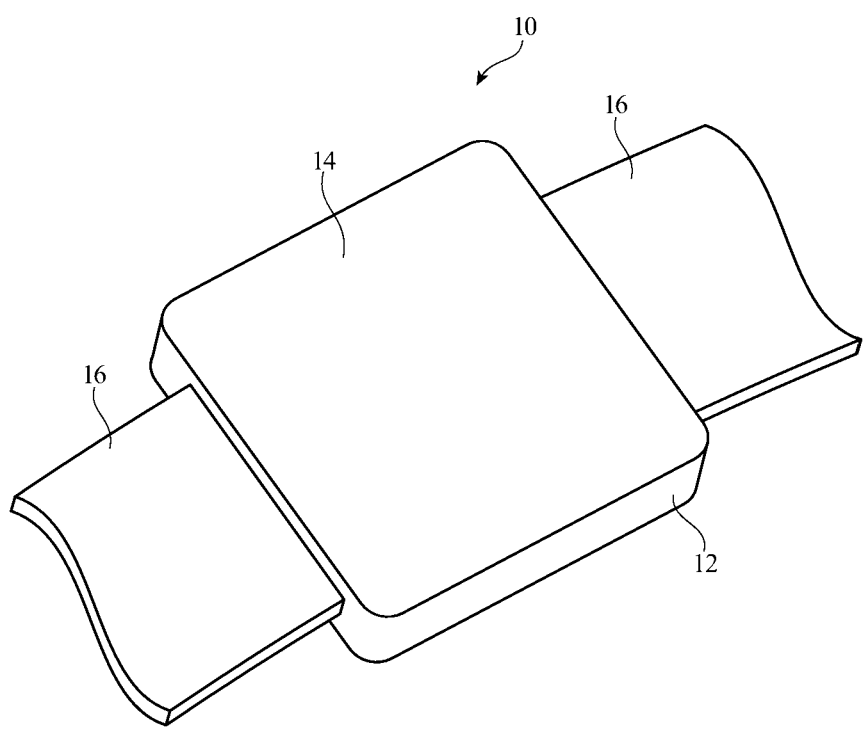
FIG. 1 is a front perspective view of an illustrative electronic device in accordance with an embodiment.

An electronic device such as electronic device 10 of FIG. 1 may be provided with wireless circuitry. The wireless circuitry may include antennas. Antennas such as cellular telephone antennas and wireless local area network and satellite navigation system antennas may be formed from electrical components such as displays, touch sensors, near-field communications antennas, wireless power coils, peripheral antenna resonating elements, and device housing structures.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch. Other configurations may be used for device 10 if desired. The example of FIG. 1 is merely illustrative.

In the example of FIG. 1, device 10 includes a display such as display 14. Display 14 has been mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls or sidewalls formed from other materials.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels, an array of electrowetting display pixels, or display pixels based on other display technologies.

Display 14 may be protected using a display cover layer. The display cover layer may be formed from a transparent material such as glass, plastic, sapphire or other crystalline dielectric materials, ceramic, or other clear materials.

Device 10 may, if desired, be coupled to a strap such as strap 16. Strap 16 may be used to hold device 10 against a user's wrist (as an example). Configurations that do not include straps may also be used for device 10.

Figure 2:
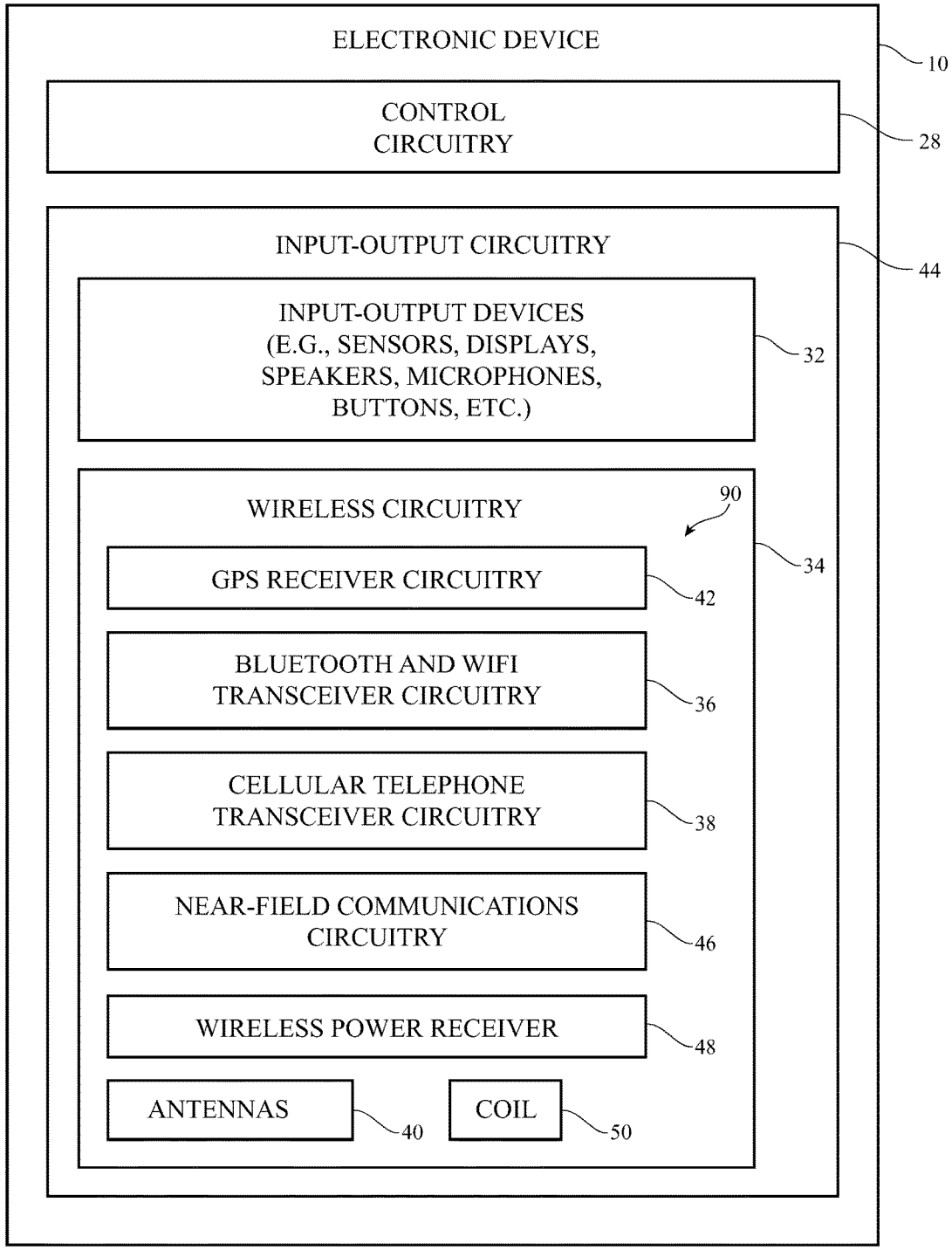
FIG. 2 is a schematic diagram of an illustrative electronic device in accordance with an embodiment.

A schematic diagram showing illustrative components that may be used in device 10 is shown in FIG. 2. As shown in FIG. 2, device 10 may include control circuitry such as storage and processing circuitry 28. Storage and processing circuitry 28 may include storage such as hard disk drive storage, nonvolatile memory flash memory or other electrically-programmable-read-only memory configured to form a solid state drive), volatile memory (e.g., static or dynamic random-access-memory), etc. Processing circuitry in storage and processing circuitry 28 may be used to control the operation of device 10. This processing circuitry may be based on one or more microprocessors, microcontrollers, digital signal processors, application specific integrated circuits, etc.

Storage and processing circuitry 28 may be used to run software on device 10, such as internet browsing applications, voice-over-internet-protocol (VOIP) telephone call applications, email applications, media playback applications, operating system functions, etc. To support interactions with external equipment, storage and processing circuitry 28 may be used in implementing communications protocols. Communications protocols that may be implemented using storage and processing circuitry 28 include internet protocols, wireless local area network protocols (e.g., IEEE 802.11 protocols—sometimes referred to as WiFi®), protocols for other short-range wireless communications links such as the Bluetooth® protocol, cellular telephone protocols, MIMO protocols, antenna diversity protocols, etc.

Input-output circuitry 44 may include input-output devices 32. Input-output devices 32 may be used to allow data to be supplied to device 10 and to allow data to be provided from device 10 to external devices. Input-output devices 32 may include user interface devices, data port devices, and other input-output components. For example, input-output devices 32 may include touch screens, displays without touch sensor capabilities, buttons, scrolling wheels, touch pads, key pads, keyboards, microphones, cameras, buttons, speakers, status indicators, light sources, audio jacks and other audio port components, digital data port devices, light sensors, light-emitting diodes, motion sensors (accelerometers), capacitance sensors, proximity sensors, magnetic sensors, force sensors (e.g., force sensors coupled to a display to detect pressure applied to the display), etc.

Input-output circuitry 44 may include wireless circuitry 34. Wireless circuitry 34 may include coil 50 and wireless power receiver 48 for receiving wirelessly transmitted power from a wireless power adapter. To support wireless communications, wireless circuitry 34 may include radio-frequency (RF) transceiver circuitry formed from one or more integrated circuits, power amplifier circuitry, low-noise input amplifiers, passive RF components, one or more antennas such as antennas 40, transmission lines, and other circuitry for handling RF wireless signals. Wireless signals can also be sent using light (e.g., using infrared communications).

Wireless circuitry 34 may include radio-frequency transceiver circuitry 90 for handling various radio-frequency communications bands. For example, circuitry 34 may include transceiver circuitry 36, 38, 42, and 46. Transceiver circuitry 36 may be wireless local area network transceiver circuitry that may handle 2.4 GHz and 5 GHz bands for WiFi® (IEEE 802.11) communications and that may handle the 2.4 GHz Bluetooth® communications band. Circuitry 34 may use cellular telephone transceiver circuitry 38 for handling wireless communications in frequency ranges such as a low communications band from 700 to 960 MHz, a midband from 1400 MHz or 1500 MHz to 2170 MHz (e.g., a midband with a peak at 1700 MHz), and a high band from 2170 or 2300 to 2700 MHz (e.g., a high band with a peak at 2400 MHz) or other communications bands between 700 MHz and 2700 MHz or other suitable frequencies (as examples). Circuitry 38 may handle voice data and non-voice data. Wireless communications circuitry 34 can include circuitry for other short-range and long-range wireless links if desired. For example, wireless communications circuitry 34 may include 60 GHz transceiver circuitry, circuitry for receiving television and radio signals, paging system transceivers, near field communications (NFC) transceiver circuitry 46 (e.g., an NFC transceiver operating at 13.56 MHz or other suitable frequency), etc. Wireless circuitry 34 may include satellite navigation system circuitry such as global positioning system (GPS) receiver circuitry 42 for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Wireless circuitry 34 may include antennas 40. Antennas 40 may be formed using any suitable antenna types. For example, antennas 40 may include antennas with resonating elements that are formed from loop antenna structures, patch antenna structures, inverted-F antenna structures, slot antenna structures, planar inverted-F antenna structures, helical antenna structures, monopole antennas, dipoles, hybrids of these designs, etc. Different types of antennas may be used for different bands and combinations of bands. For example, one type of antenna may be used in forming a local wireless link antenna and another type of antenna may be used in forming a remote wireless link antenna. In some configurations, different antennas may be used in handling different bands for cellular telephone transceiver circuitry 38. For example, a first antenna may handle a low band at 700-960 MHz for transceiver circuitry 38 and a second antenna may handle satellite navigation system frequencies and cellular telephone communications at frequencies above 960 MHz for transceiver circuitry 38.

In compact electronic devices, space is at a premium. It may therefore be desirable to implement antennas in device 10 using portions of electrical components that would otherwise not be used as antennas and that support additional device functions. As an example, it may be desirable to induce antenna currents in components such as display 14, so that display 14 and/or other electrical components (e.g., a touch sensor, near-field communications loop antenna, etc.) can serve as an antenna for cellular frequencies and/or other frequencies without the need to incorporate bulky antenna structures in device 10. As another example, a component such as coil 50, which receives wireless power signals (generally at frequencies in the kHz-MHz range that are below the 700 MHz lower end of cellular telephone frequencies) can also be used in handling cellular telephone transmissions (e.g., at 700-960 MHz or other suitable frequencies). Peripheral conductive structures such as an antenna resonating element that runs along the periphery of housing 12 may also be used in forming antennas 40 (e.g., to form a wireless local area network antenna, etc.).

Figure 3:
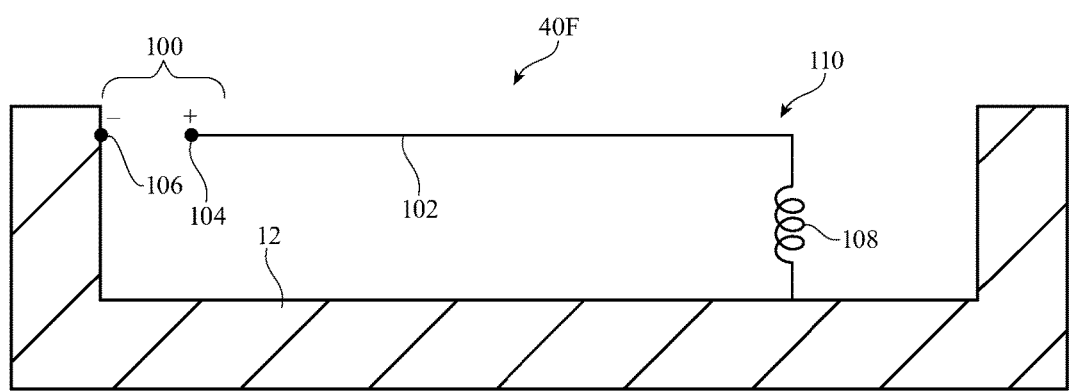
FIG. 3 is a schematic diagram of an illustrative monopole antenna in accordance with an embodiment.

FIG. 3 is a simplified cross-sectional side view of device 10 showing how an antenna for device 10 may be formed within a cavity formed from housing 12. Antenna 40F of FIG. 3 may have an antenna resonating element such as resonating element 102 coupled to an antenna feed such as feed 100. Feed 100 may have a positive antenna feed terminal such as positive antenna feed terminal 104 and a ground antenna feed terminal such as ground antenna feed terminal 106. Positive antenna feed terminal 104 may be coupled to antenna resonating element 102. Ground antenna feed terminal 106 may be coupled to ground (e.g., to metal sidewall portions of housing 12 and other conductive structures around element 102 such as printed circuit structures to form an antenna cavity in the example of FIG. 3). Feed 100 may be coupled to transceiver circuitry 90 by a transmission line such as a coaxial cable or a flexible printed circuit transmission line. Resonating element 102 may be a monopole antenna resonating element (e.g., antenna 40F may be a cavity-backed monopole antenna) or other suitable antenna resonating element.

As shown in the illustrative configuration of FIG. 3, a portion of antenna resonating element 102 such as tip 110 of antenna resonating element 102 may be coupled to ground (e.g., housing 12) by inductive path 108 (e.g., a path formed from metal traces on a flexible printed circuit or other suitable signal path). Antenna 40F may be used to transmit and receive radio-frequency signals in cellular telephone bands and other bands (e.g., bands above 700 MHz, bands above 960 MHz, etc.) or other suitable frequency bands. Additional antennas may also be provided in device 10 to handle these frequency bands and/or other frequency bands. The configuration for antenna 40F of FIG. 3 is merely illustrative.

Figure 4:
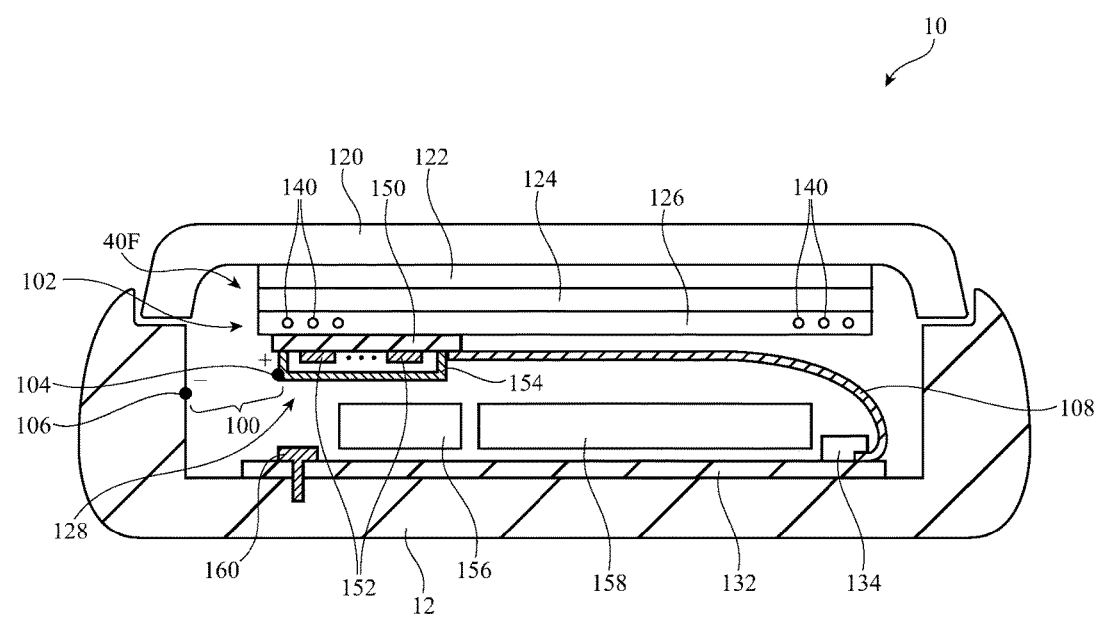
FIG. 4 is a cross-sectional side view of an illustrative electronic device in accordance with an embodiment.

FIG. 4 is a cross-sectional side view of an illustrative electronic device such as device 10 of FIG. 1. In the illustrative configuration of FIG. 4, antenna resonating element 102 of antenna 40F has been formed from a stack of capacitively coupled electrical components under display cover layer 120 of display 14. Device 10 may have a housing such as housing 12 (e.g., a housing having metal sidewalls and/or other metal portions) that serves as antenna ground for antenna 40F. The components under display cover layer 120 that are used in forming antenna resonating element 102 for antenna 40F may have planar shapes (e.g., planar rectangular shapes, planar circular shapes, etc.) and may include conductive structures formed from metal and/or other conductive material that carry antenna currents. The thin planar shapes of these components and the stacked configuration of FIG. 4 capacitively couple these components to each other so that they may operate together at radio frequencies to from antenna resonating element 102.

The components that form antenna resonating element 102 may include, for example, planar components such as touch sensor 122, display panel 124 (sometimes referred to as a display, display layer, or pixel array), and near-field communications antenna 126, and may include near-field communications circuitry 128. Touch sensor 122 may be a capacitive touch sensor and may be formed from a polyimide substrate or other flexible polymer layer with transparent capacitive touch sensor electrodes (e.g., indium tin oxide electrodes). Display panel 124 may be an organic light-emitting diode display layer or other suitable display layer. Near-field communications antenna 126 may be formed from a flexible layer that includes a magnetic shielding material (e.g., a ferrite layer or other magnetic shielding layer) and that includes loops of metal traces such as near-field communications loops 140). Antenna 40F may be fed using antenna feed 100. Feed 100 may have a positive terminal such as terminal 104 that is coupled to antenna resonating element 102 (e.g., to near-field communications circuitry 128 or other portion of the stacked components of FIG. 4). Feed 100 may have a ground terminal such as terminal 106 that is coupled to an antenna around in device 10 (e.g., metal housing 12).

Near-field communications circuitry 128 may include a printed circuit substrate such as printed circuit 150, near-field communications transceiver circuitry 46 and other electrical components (components 152) that are mounted to printed circuit 150, and metal shield can 154, which overlaps and shield components 152.

Inductive path 108 may be formed from a flexible printed circuit with metal traces that extend between near-field communications circuitry 128 and printed circuit 130. At one end of path 108, path 108 may be coupled to printed circuit 132 of near-field communications circuitry 128 (e.g., using a zero-insertion-force connector or other coupling mechanism). At an opposing end of path 108, path 108 may be coupled to printed circuit 132 and system-in-package circuitry 134 on printed circuit 132 (see, e.g., circuitry 28 and/or circuitry 44 of FIG. 2). Path 108 may serve as part of antenna 40F as described in connection with FIG. 3 and may also carry data and control signals between system-in-package circuitry 134 and other circuitry on printed circuit 132 and the stack of components under display cover layer 120 (e.g., touch sensor layer 122, display layer 124, and near-field communications antenna layer 126) and near-field communications circuitry 128.

Conductive structures such as metal screw 160 may be used to couple signal traces in printed circuit 132 to ground (e.g., so that path 108 may be coupled to housing 12).

Components such as vibrator 156 (e.g., an electromagnetic actuator that control circuitry 28 may control to provide alerts to a user) and battery 158 (e.g., a battery that is wirelessly charged using wireless power receiver 48 and coil 50) may be interposed between the rear of device 12 (shown as housing 12 in the illustrative arrangement of FIG. 4) and components such as components 122, 124, and 126.

Figure 5:
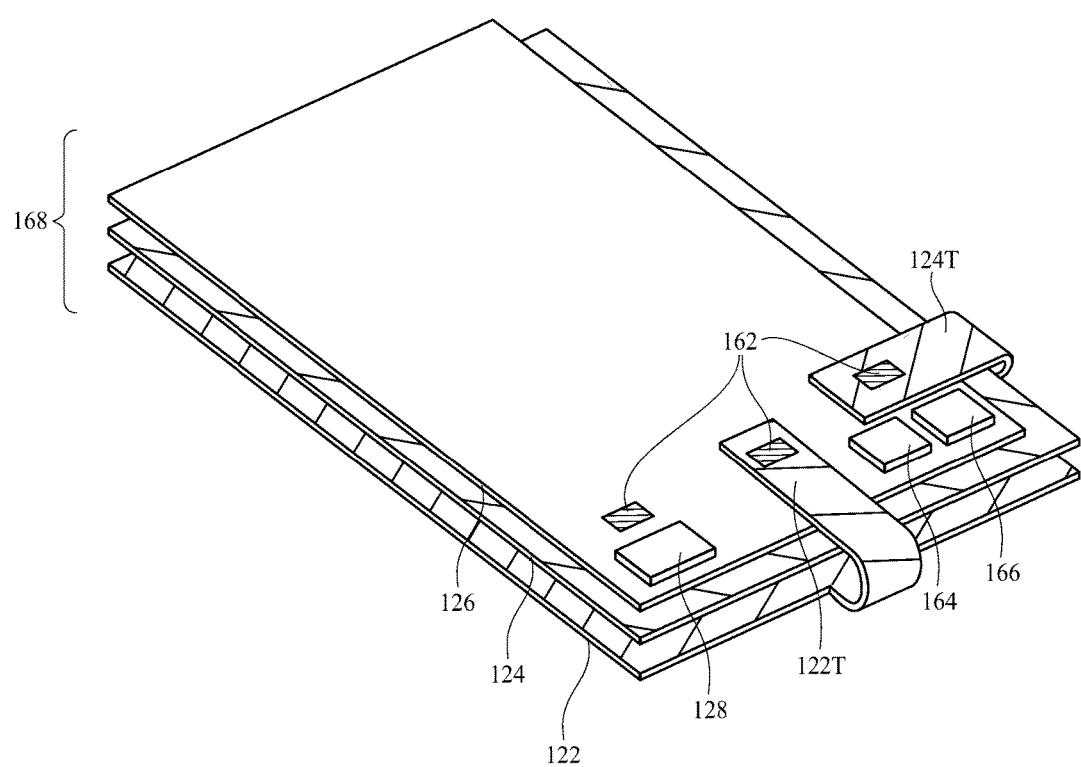
FIG. 5 is a rear perspective view of illustrative layers of capacitively coupled components in an illustrative electronic device in accordance with an embodiment.

A rear perspective view of illustrative electrical components that may be stacked under display cover layer 120 and that may form antenna resonating element 102 of antenna 40F is shown in FIG. 5. As shown in FIG. 5, component stack 168 may include touch sensor layer 122, display layer 124, and near-field communications antenna layer 126. Layer 122, layer 124, and layer 126 are stacked next to each other and are therefore capacitively coupled to each other. This allows layers 122, 124 and 126 to operate together as an antenna resonating element at radio frequencies (e.g., at cellular telephone frequencies). Layer 122, layer 124, and layer 126 may be interconnected with other components in device 10 using connectors 162. Connectors 162 may be mounted on the underside of layer 126, on tail 122T of layer 122, on tail 124T of layer 124, and/or on other suitable structures. Near-field communications circuitry 128 and additional circuitry such as touch sensor processing circuitry 164 and display driver circuitry 166 may be mounted on the underside of near-field communications antenna layer 126 (as an example). Other types of components may be mounted in stack 168 if desired. For example, a force sensor layer may be included in stack 168. As another example, the functions of two or more of these layers may be consolidated. For example, capacitive touch sensor electrodes for a capacitive touch sensor may be formed from metal traces on organic light-emitting diode display layer 124 and a separate touch sensor layer 122 may be omitted. Near-field communications antenna layer 126 may also be omitted (e.g., in a configuration for device 10 without near-field communications circuitry and/or in a configuration for device 10 in which the near-field communications antenna is located in a different portion of housing 12). The configuration of electrical component stack 168 of FIG. 5 is illustrative.

Figure 6:
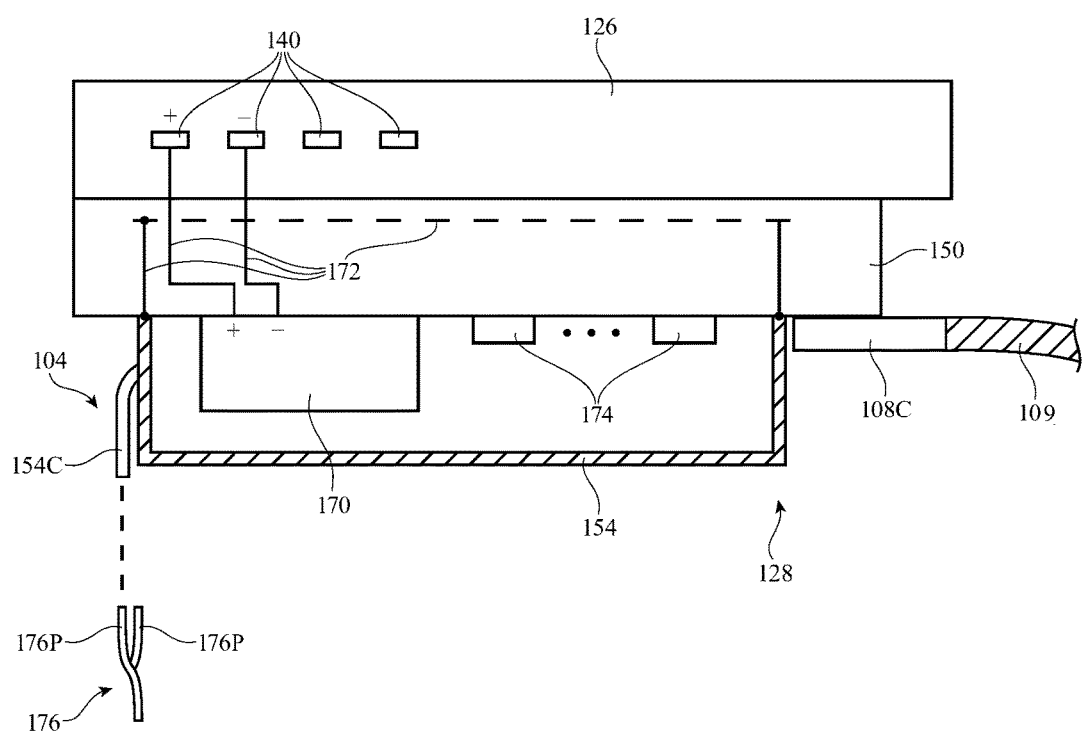
FIG. 6 is a cross-sectional side view of components that may be used in forming an electronic device antenna in accordance with an embodiment.
Figure 7:
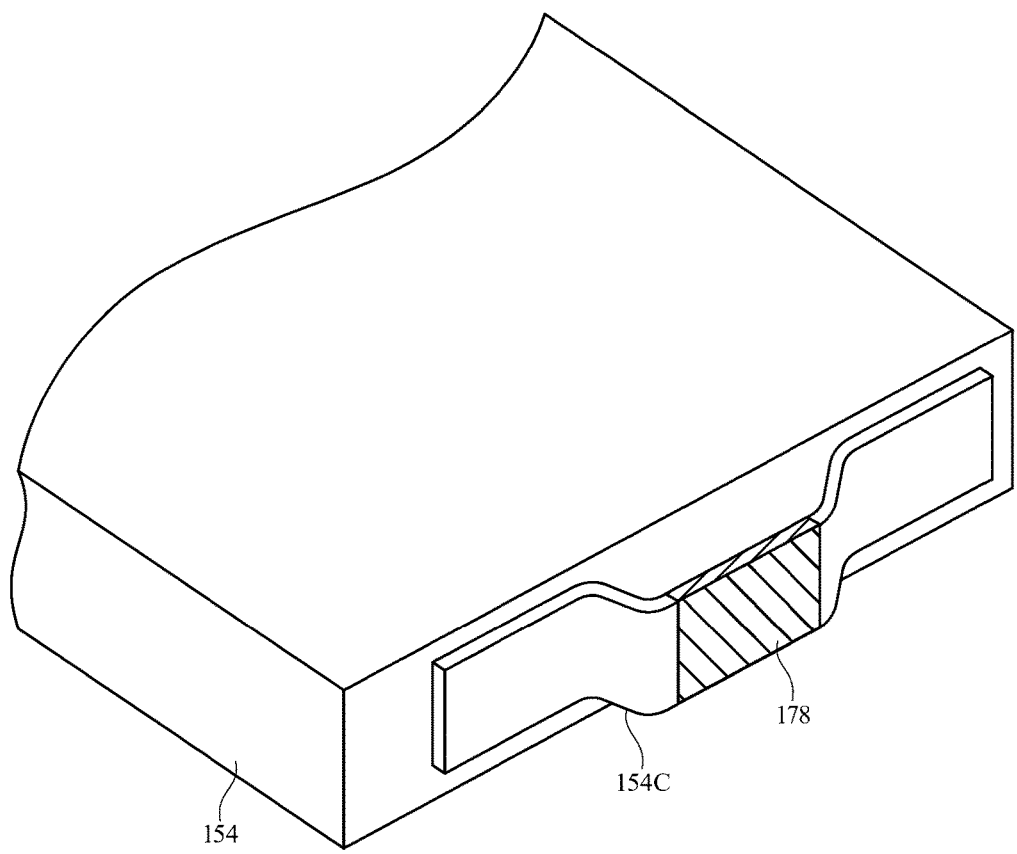
FIG. 7 is a perspective view of an illustrative shielding can having a portion that may be used in coupling an antenna feed terminal to the components of FIG. 6 in accordance with an embodiment.

FIG. 6 is a cross-sectional side view of a portion of near-field communications antenna layer 126 and associated near-field communications circuitry 128. As shown in FIG. 6, near-field communications circuitry 128 may include circuitry such as circuitry 170 (see, e.g., near-field communications transceiver circuitry 46 of FIG. 2) that is coupled to near-field communications antenna loops such as traces 140. There may be any suitable number of loop-shaped traces 140 in the near-field communications antenna of device 10 (e.g., 2-40 loops, more than 5 loops, fewer than 30 loops, etc.). Signal paths 172 (e.g., metal traces in layers 126 and 150) may be used in coupling circuitry 170 to traces 140 and in forming a ground for shielding can 154. Circuitry 170 and additional circuits such as circuits 174 may be housed under shielding can 154. Flexible printed circuit 109 may be coupled to printed circuit 132 using connector 108C.

Shielding can (shield can) 154 may be formed from metal and may have a tab, clip, or other protruding portion such as portion 154C that serves as antenna feed terminal 104. Portion 154C of can 154 may be received between flexible spring fingers such as metal prongs 176P in clip 176. Clip 176 may be coupled to a positive signal path on a flexible printed circuit transmission line or other suitable signal path coupled to transceiver circuitry 90 so that antenna signals may be provided via clip 176 to shielding can 154.

A rear perspective view of shielding can 154 in an illustrative configuration in which portion 154C has been formed from a strip of metal (e.g., a portion of can 154 and/or additional strip of metal that is joined to shielding can 154). Portion 154C may have a coating such as coating 178 (e.g., gold, nickel, or other metals) to facilitate good ohmic contact between portion 154C and prongs 176P of clip 176 when the coated surface of portion 154C is received between prongs 176P.

Figure 8:
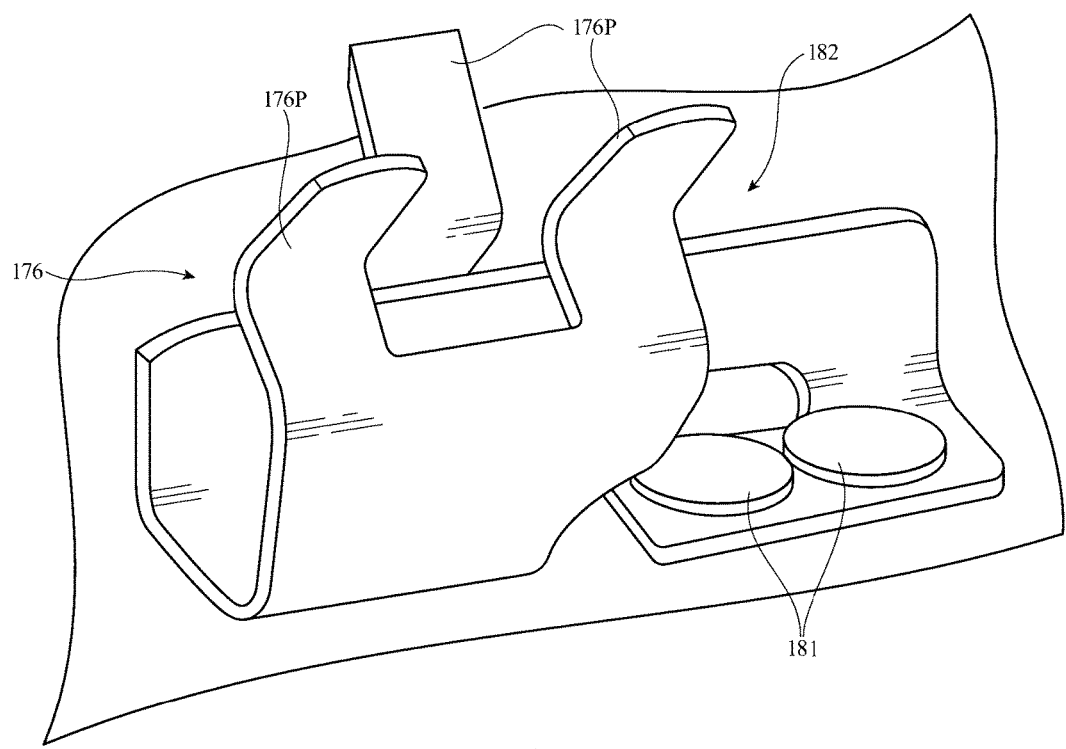
FIG. 8 is a perspective view of an illustrative set of spring fingers that may be used to couple a positive antenna feed terminal to the shielding can of FIG. 7 in accordance with an embodiment.

A perspective view of clip 176 in an illustrative configuration in which clip 176 is secured using fasteners such as screws 181 is shown in FIG. 8. Clip 176 may be mounted on a plastic support on housing 12 or other suitable support structures. Metal traces in a flexible printed circuit such as flexible printed circuit 182 may route positive antenna feed signals to clip 176. If desired, impedance matching circuitry and other circuitry may be mounted on printed circuit 182.

Antenna 40F may be effective at operating through the front of device 10 and may therefore sometimes be referred to as forming a from face antenna for device 10. If desired peripheral conductive member may be used in forming an antenna for device 10 and/or a rear face antenna may be used in forming an antenna for device 10.

Consider, as an example, the side view of the rear of device 10 of FIG. 1. In a configuration of the type shown in FIG. 9, rear housing wall 12R may be formed from a material such as plastic, glass, or other dielectric and may have a circular shape or other shape that allows rear wall 12R to be received within other portions of housing 12 (e.g., metal housing portions such as metal sidewalls, etc.). Coil 50 may be formed from loops of conductive wire, loops of metal traces on a printed circuit, or other loops of conductive signal paths. Rear housing wall 12R may have a curved outer surface that rests against a user's body (e.g., wrist 180) when device 10 is worn by a user. If desired, rear wall 12R may have an opening with one or more transparent windows such as window 184. Light-based components 182 may be mounted in alignment with windows such as window 184. Components 182 may include light-emitting diodes (e.g., infrared light-emitting diodes, visible light-emitting diodes, etc.) and may include light detectors (e.g., detectors for detecting light that has been emitted by the light-emitting diodes after reflecting from wrist 180). Configurations such as these may allow light-based components 182 to be used to monitor a user's physiological parameters (heart rate, blood oxygen level, etc.).

The signal paths in coil 50 and/or other metal structures adjacent to rear wall 12R such as metal antenna traces on a plastic carrier associated with components 182 or other structures in device 10 may be used in forming a rear face antenna for device 10 (antenna 40R). During operation, antenna 40R may transmit and/or receive radio-frequency signals having electric fields that are oriented normal to the surfaces of rear face 12R and wrist 180. These signals may sometimes be referred to as creeping waves and may allow antenna 40R to operate efficiently even in the presence of wrist 180.

Figure 10:
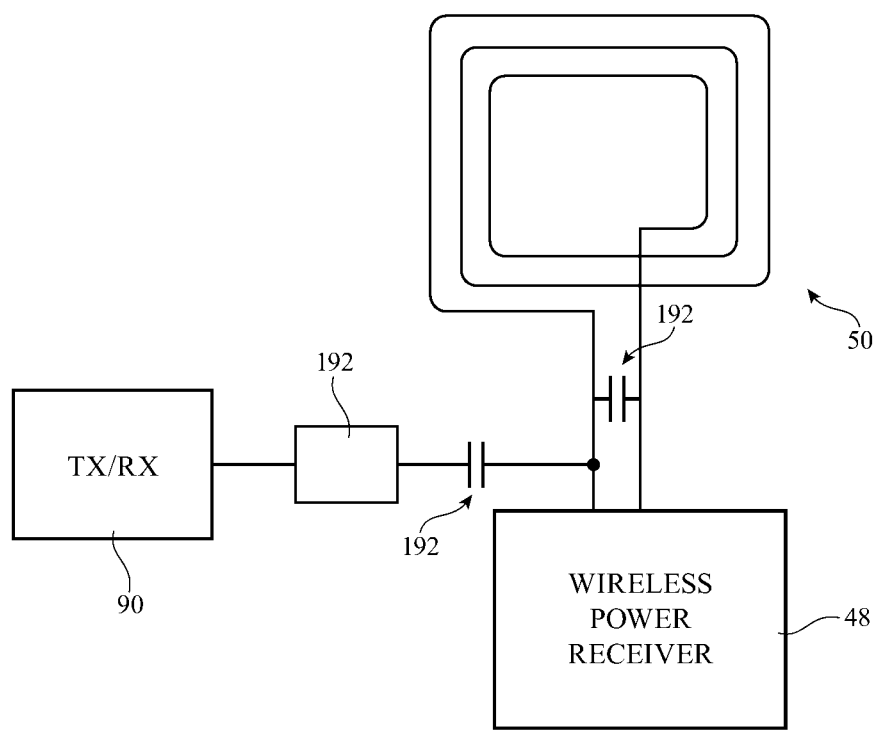
FIG. 10 is a schematic diagram of an illustrative wireless power coil of the type that may be used as a cellular telephone antenna in accordance with an embodiment.

FIG. 10 is a circuit diagram of illustrative circuitry that may be used in device 10 to allow radio-frequency transceiver circuitry 90 to use coil 50 as rear face antenna 40R at radio frequencies (e.g., a cellular telephone frequencies). When receiving wireless power, coil 50 may receive wirelessly transmitted alternating-current signals that have been transmitted from a wireless power adapter or other wireless power transmitting device. Wireless power receiver 48 may have rectifier circuitry that rectifies the received alternating-current wireless power signals to produce direct-current power for device 10. Matching circuit 190 may be used to couple radio-frequency transceiver circuitry 90 to coil 50.

Radio-frequency transceiver circuitry 90 may operate at frequencies from 700 MHz to 960 MHz (e.g., a low cellular telephone communications band) or at other suitable frequencies (e.g., frequencies above 700 MHz, etc.). At these frequencies, coupling capacitors 192 form short circuits, so that transmitted radio-frequency signals can be applied to the conductive material in coil 50 and so that radio-frequency signals that are received by coil 50 can be conveyed to radio-frequency transceiver 90. At frequencies above 700 MHz, the conductive paths in coil 50 may form an antenna such as a patch or monopole antenna (e.g., coil 50 does not operate as an inductor at these frequencies). At the lower frequencies associated with wireless power reception (e.g., at frequencies in the range of 1 kHz-100 MHz or other suitable frequencies), capacitors 192 form open circuits and allow wireless power signals to be received that induce current flow around the loops of coil 50.

Figure 11:
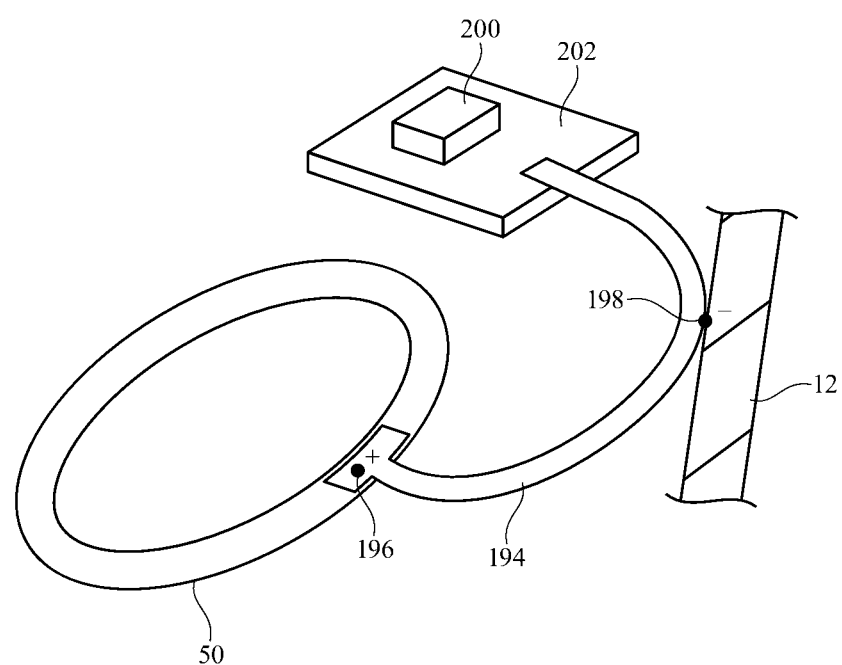
FIG. 11 is a perspective view of illustrative wireless circuitry for an electronic device having a wireless power coil used as a cellular telephone antenna in accordance with an embodiment.

FIG. 11 is a perspective view of illustrative structures that may be used to route signals to and from coil 50. In the example of FIG. 11, coil 50 has been implemented using a ring-shaped flexible printed circuit with loops of metal traces. A signal path such as flexible printed circuit cable 194 (sometimes referred to as a "coil flex") may be used to couple printed circuit 202 to coil 50. Circuitry 200 on printed circuit 202 may include wireless power receiver 48 and wireless transceiver circuitry 90. When transceiver 90 is using coil 50 as a low-band cellular telephone antenna, coil 50 may be feed using an antenna feed having a positive antenna feed terminal such as feed terminal 196 and a ground antenna feed terminal such as ground antenna feed terminal 198. Ground antenna feed terminal 198 may be coupled to an antenna ground such as a metal portion of housing 12 (as an example). When wireless power is being received by coil 50, signals from coil 50 may be routed to wireless power receiver 48 in circuitry 200 via metal traces in flexible printed circuit 194.

If desired, an antenna signal path such as a flexible printed circuit with a transmission line (see, e.g., printed circuit 194) may be used to couple transceiver circuitry 90 to metal traces on a plastic support structure or other dielectric structure adjacent to rear housing 12R. In this type of configuration, the metal traces on the plastic support structure may serve as an antenna resonating element for rear face antenna 40R.

Figure 9:
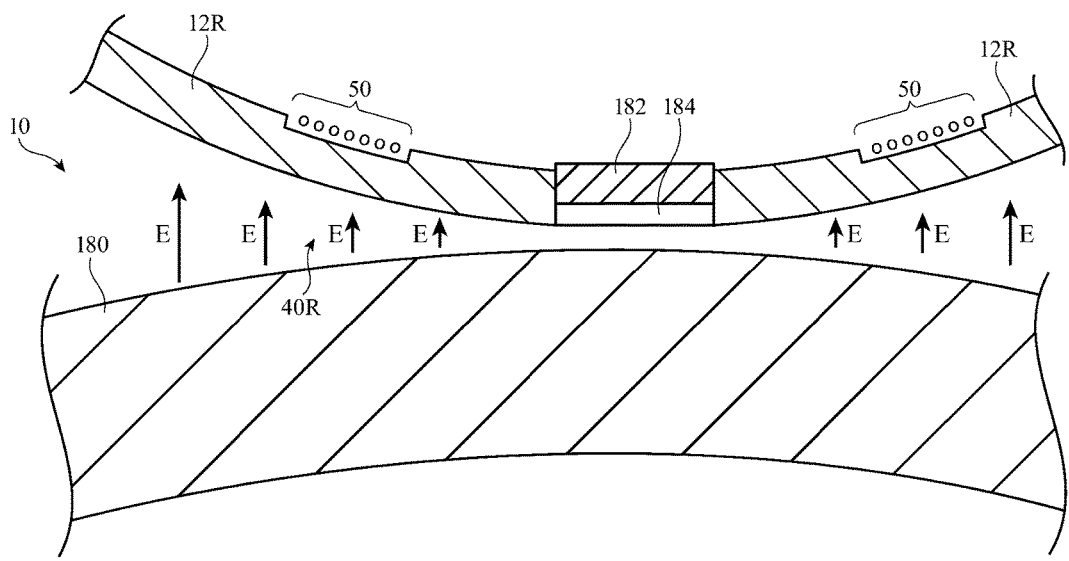
FIG. 9 is a cross-sectional side view of a rear portion of an electronic device having structures that may form an antenna in accordance with an embodiment.
Figure 12:
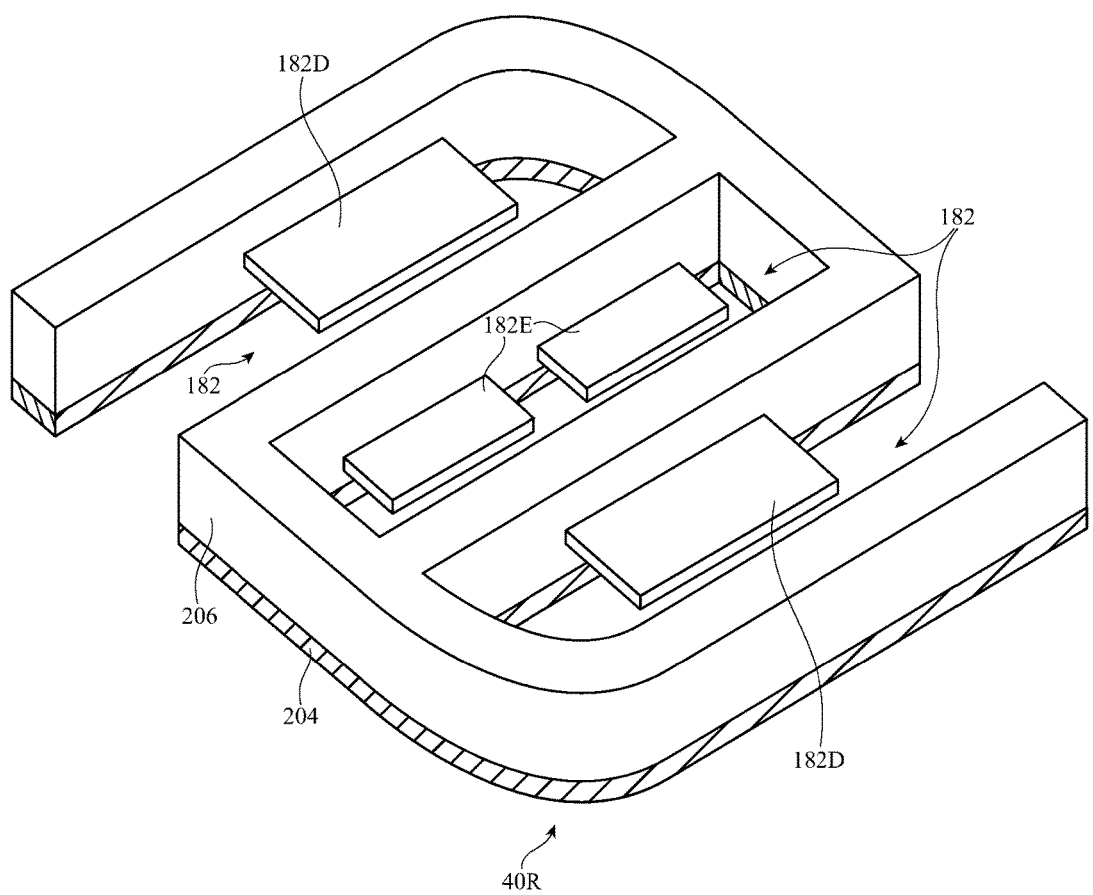
FIG. 12 is a perspective view of an illustrative support structure of the type that may be used as an antenna carrier for an electronic device antenna in accordance with an embodiment.

With one illustrative configuration, which is shown in FIG. 12, light-based components 182 such as light-emitting diodes 182E and light detectors 182D may be mounted within a tray or other support structure such as support member 206 of FIG. 12. Member 206 may be formed from a dielectric material such as opaque plastic. The portions of support member 206 that are interposed between light-emitting diodes 182E and light detectors 182D may help prevent internal stray light that has been emitted from light-emitting diodes 182E from reaching light detectors 182D. Member 206 may be mounted adjacent to rear housing structure 12R (FIG. 9), so that light-based components 184 are aligned with respective transparent windows such as window 184 (FIG. 9).

Metal traces 204 on the surface of plastic member 206 may be used to form an antenna resonating element for antenna 40R (e.g., a monopole antenna resonating element, an inverted-F antenna resonating element, a patch antenna resonating element, etc.). Metal traces 204 may be formed on the lower surface of member 206 adjacent to housing wall structure 12R or may be formed on other portions of member 206. Gaps may be formed in portions of layer 204 (e.g. in portions of layer 204 adjacent to the gap between light-emitting diodes 182E) to reduce undesired current loops that could reduce efficiency (e.g., when layer 204 is operating as a monopole antenna resonating element). In configurations in which rear face antenna 40R is formed from metal traces 204 on support member 20, coil 50 may be used exclusively for receiving wireless power signals. In configurations in which traces 204 are omitted, coil 50 may be used to receive wireless power signals and may be used to form antenna 40R, as described in connection with FIG. 10.

Figure 13:
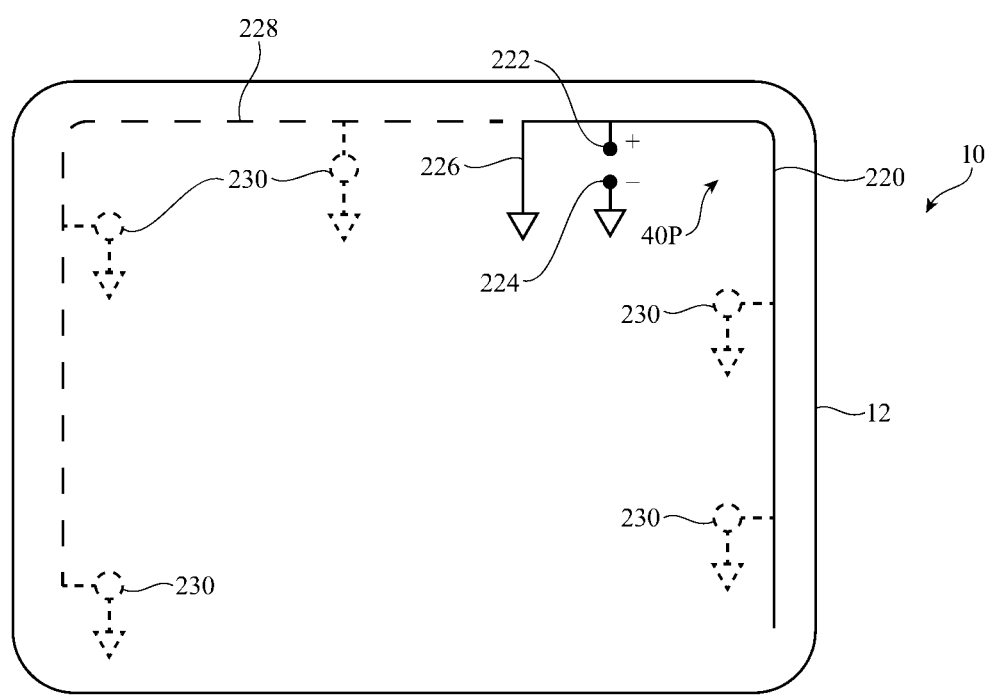
FIG. 13 is a top view of an illustrative electronic device with a peripheral antenna that runs along a peripheral edge of the device in accordance with an embodiment.

In addition to front face antenna 40F and rear face antenna 40R, device 10 may have one or more peripheral antennas such as peripheral antenna 40P of FIG. 13. Peripheral antenna 40P may have a peripheral antenna resonating element such as peripheral antenna resonating element 220. Antenna resonating element 220 may run alone one, two, or more than two edges of device 10. Antenna resonating element 220 may be a monopole resonating element or may, if desired, be an inverted-F antenna resonating element having a return path such as path 226 that shorts element 220 to ground in parallel with an antenna feed formed from positive antenna feed terminal 222 and ground antenna feed terminal 224. If desired, element 220 may be extended and/or additional resonating elements may be formed along the periphery of housing 12, as indicated by illustrative additional resonating element conductive material 228. If desired, one or more circuits such as circuits 230 may be coupled between antenna resonating element structures and ground (e.g., tunable circuits, capacitors, inductors, and/or other antenna circuitry).

Figure 14:
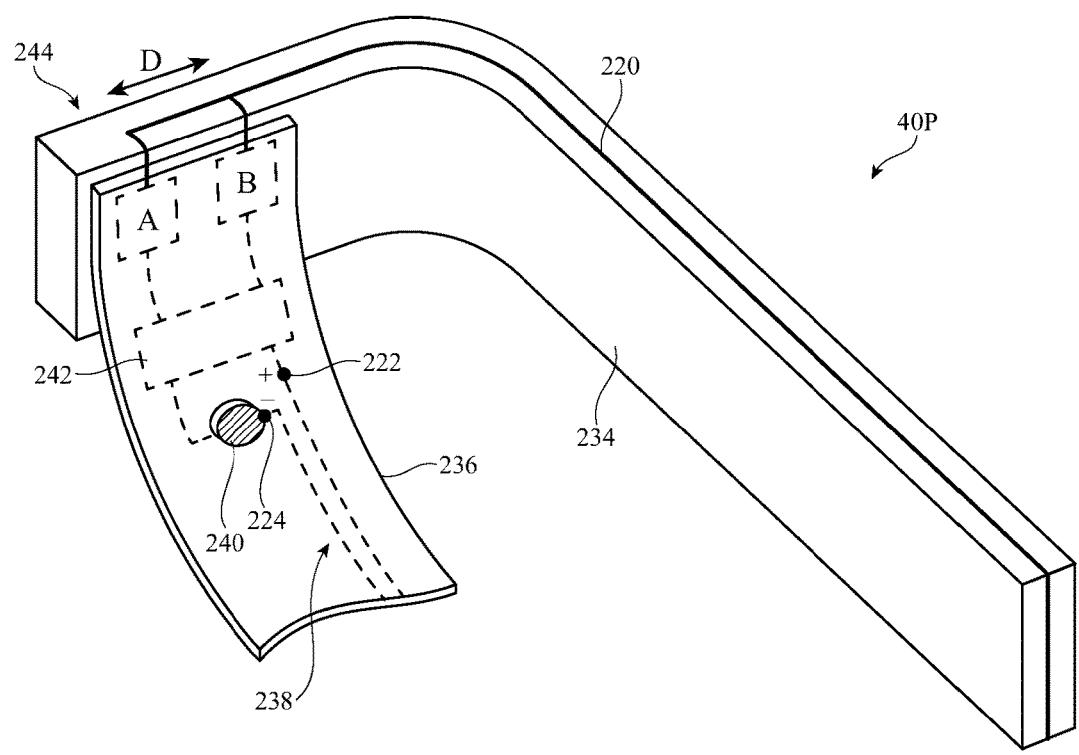
FIG. 14 is a perspective view of an illustrative antenna resonating element for the antenna of FIG. 13 in accordance with an embodiment.

An illustrative configuration for antenna resonating element 220 of antenna 40P is shown in FIG. 14. As shown in FIG. 14, resonating element 220 may be formed from a conductive member such as a sheet metal member (strip of sheet metal) embedded in molded plastic antenna carrier 232. Carrier 232 may be received within a peripheral groove in the underside of display cover layer 120 (FIG. 4) or may be mounted in other peripheral portions of device 10. Portions of element 220 may form terminals A and B. Terminal A may be located at end 244 of element 220 and terminal B may be located a distance D along the length of element 220 away from end 244 of element 220. Flexible printed circuit 236 may have a transmission line such as transmission line 238 with a positive signal conductor that is coupled to positive antenna feed terminal 222 and a ground signal conductor that is coupled to ground antenna feed terminal 224. Feed terminal 224 may be grounded (e.g., to metal housing 12 or other suitable ground structure in device 10) using a metal fastener such as screw 240 that is screwed into housing 12 or other electrical connection. Switching circuitry 242 may be used to selectively couple terminals A and B to different portions of flexible printed circuit 236, thereby allowing antenna 40P to be placed in different modes of operation (e.g., for antenna tuning, etc.).

Figure 15:
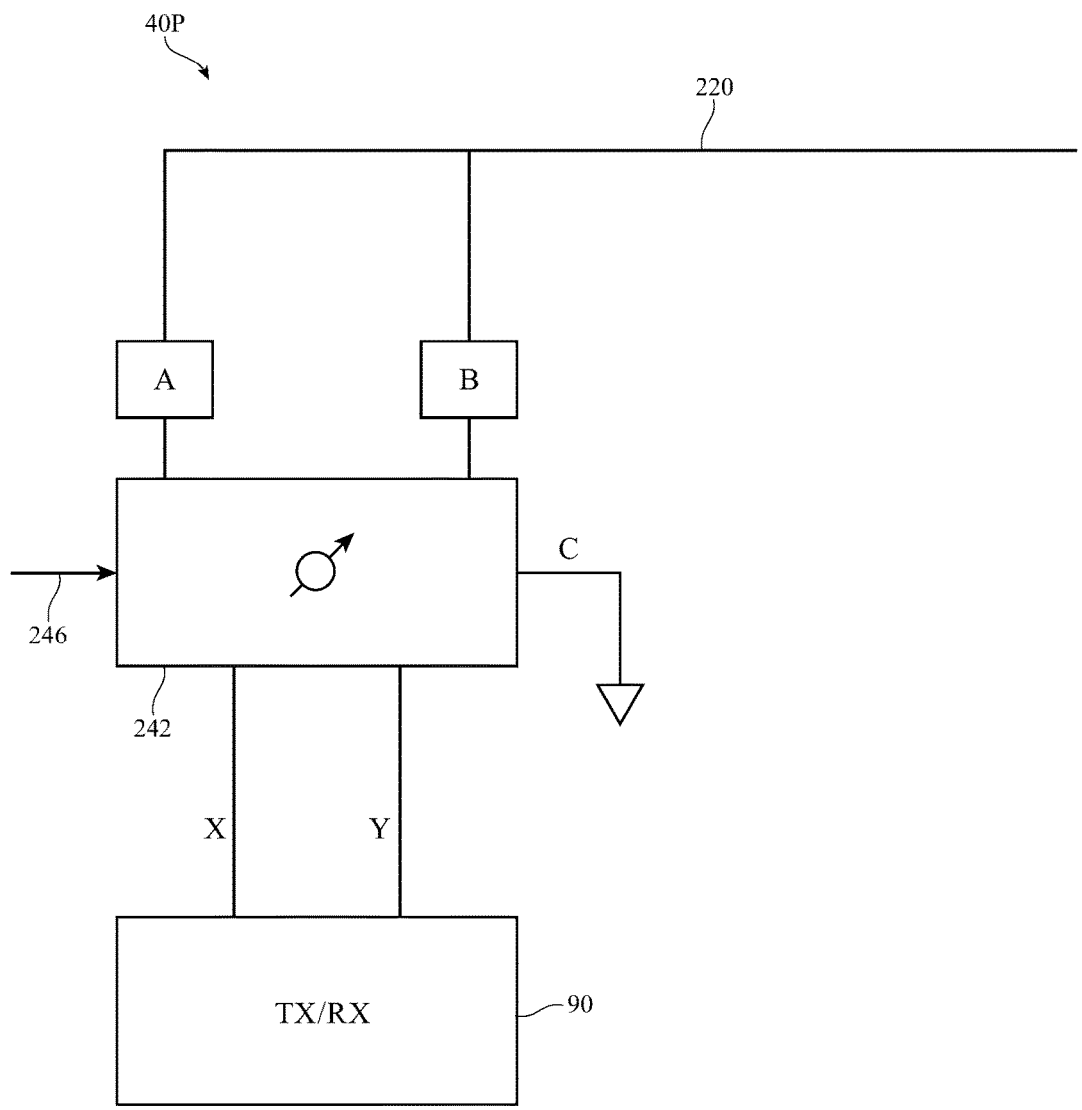
FIG. 15 is a perspective view of an illustrative antenna with an antenna resonating element of the type shown in FIG. 14 coupled to radio-frequency transceiver circuitry in accordance with an embodiment.

FIG. 15 is a schematic diagram showing how switching circuitry 242 may include tunable components such as adjustable phase shifter 244. If desired, circuitry 242 may have other tunable components (e.g., tunable inductors, tunable capacitors, etc.). Switching circuitry 242 may be configured by control signals received at input 246 from control circuitry 28. Transceiver circuitry 90 (e.g., transceiver circuitry 36 of FIG. 2 and/or other radio-frequency transceiver circuitry that transmits and/or receives antenna signals using peripheral antenna 40P) may have terminals X and Y that are coupled to circuitry 242. Ground terminal C (see, e.g., screw 240 of FIG. 14, which may be coupled to metal portions of housing 12 that serve as antenna ground) may also be coupled to circuitry 242.

FIG. 16 is a table showing illustrative modes of operation for antenna 40P. Antenna 40P may be configured to operate in different modes of operation such as modes M1, M2, and M3 of FIG. 16 and/or additional modes of operation. The example of FIG. 16 is merely illustrative.

In mode M1 of the illustrative example of FIG. 16, terminal X may be coupled to terminal A and terminal Y may be coupled to terminal B. In this mode, antenna 40P may operate as an inverted-F antenna.

In mode M2, switching circuitry 242 may be configured to couple terminal Y to terminal A and to couple terminal X to terminal B. Antenna 40P in mode M2 may be an inverted-F antenna. The location of the return path of antenna 40P may be reversed between modes M1 and M2.

In mode M3, switching circuitry 242 may be configured to couple terminal B to an open circuit, to couple terminal X to terminal C (ground), and to couple terminal Y to terminal A. In this mode, which may sometimes be referred to as housing ground mode, antenna 40P may operate as a monopole antenna as an example).

Wireless circuitry 34 nuts use antennas 40F, 40R, 40P, coil 50, and near-field communications antenna 126. Near-field communications transceiver circuitry 46 may use antenna 126 to transmit and receive near-field communications signals (e.g., at 13.56 MHz or other suitable frequency). Coil 50 may be used by wireless power receiver 48 to receive wireless power (e.g., at frequencies below 100 MHZ, below 10 MHz, below 1 MHz, above 1 kHz, or other suitable frequencies). Radio-frequency signals above 700 MHz, such as signals at 2.4 GHz and/or 5 GHz for IEEE 802.11 communications, Bluetooth®, and/or other wireless local area network communications may be handled by peripheral antenna 40P as an example). Low band cellular telephone signals (e.g., cellular telephone communications at frequencies between 700 MHz and 960 MHz) may be handled by antenna 40R. Cellular telephone signals and GPS signals in a mid-band a high band, and other bands that are above 960 MHz such as cellular telephone and GPS signals at 960-2700 MHz may be handled by antenna 40F. If desired, antenna 40P may be omitted and antenna 40F may be used to handle radio-frequency signals at 2.4 GHz and/or 5 GHz for IEEE 802.11 communications, Bluetooth®, and/or other wireless local area network communications. Antenna 40F and or other antennas in device 10 may also be used in handling low-band signals (e.g., signals from 700-960 MHz), if desired.

The foregoing is merely illustrative and various modifications can be made to the described embodiments. The foregoing embodiments may be implemented individually or in any combination.

What is claimed is:

1. An electronic device having opposing front and rear faces, comprising:
    a housing having a metal housing wall that forms an antenna ground for an antenna and having a window at the rear face;
    a light-based component aligned with the window;
    a coil that surrounds the light-based component;
    wireless power receiver circuitry that uses the coil to receive wireless power signals through the rear face; and
    radio-frequency transceiver circuitry configured to transmit and receive signals through the rear face using an antenna resonating element for the antenna.

2. The electronic device defined in claim 1 wherein the coil forms the antenna resonating element and the radio-frequency transceiver circuitry comprises cellular telephone transceiver circuitry configured to transmit and receive cellular telephone signals using the antenna.

3. The electronic device defined in claim 2 further comprising a flexible printed circuit coupled between the cellular telephone transceiver circuitry and the coil.

4. The electronic device defined in claim 2 further comprising at least one capacitor coupled between the cellular telephone transceiver circuitry and the coil through which the cellular telephone signals pass.

5. The electronic device defined in claim 2 further comprising an inverted-F antenna resonating element that runs along at least one edge of the housing.

6. The electronic device defined in claim 5 further comprising wireless local area network transceiver circuitry configured to transmit and receive wireless local area network signals using the inverted-F antenna resonating element.

7. The electronic device defined in claim 6 further comprising switching circuitry coupled between the wireless local area network transceiver circuitry and the inverted-F antenna resonating element.

8. The electronic device defined in claim 5 further comprising a display on the front face.

9. The electronic device defined in claim 8 wherein the display forms part of an antenna resonating element for an additional antenna.

10. The electronic device defined in claim 9 wherein the cellular telephone transceiver circuitry is configured to transmit and receive signals from 700 MHz to 960 MHz using the coil as the antenna resonating element for the antenna and is configured to transmit and receive signals above 960 MHz using the additional antenna.

11. An electronic device having opposing front and rear faces and a peripheral edge, comprising:
    a front face antenna that includes at least one electrical component layer forming an antenna resonating element at the front face;
    a coil that receives wireless power signals through the rear face;
    a near-field communications antenna;
    a rear face antenna at the rear face;
    a peripheral antenna resonating element that runs along the peripheral edge;
    a cellular telephone transceiver configured to transmit and receive cellular telephone signals through the front face using the front face antenna and configured to transmit and receive cellular telephone signals through the rear face using the rear face antenna;
    a wireless local area network transceiver coupled to the peripheral antenna resonating element;
    near-field communications transceiver circuitry coupled to the near-field communications antenna; and
    a wireless power receiver coupled to the coil.

12. The electronic device defined in claim 1, further comprising:
    a support structure, wherein the light-based component comprises a light-emitting diode in the support structure
    a light detector in the plastic support structure.

13. The electronic device defined in claim 12, wherein the window is aligned with the light-emitting diode and the light detector.

14. The electronic device defined in claim 1 further comprising a strap coupled to the housing.

15. The electronic device defined in claim 12, wherein a portion of the support structure is interposed between the light-emitting diode and the light detector.

16. The electronic device defined in claim 1, further comprising:
- a display on the front face, wherein the display forms part of an additional antenna resonating element for an additional antenna; and
- a peripheral antenna resonating element that runs along at least one peripheral edge of the housing.

17. The electronic device defined in claim 16, wherein the radio-frequency transceiver circuitry is configured to transmit and receive cellular telephone signals using the antenna and the additional antenna and to transmit and receive wireless local area network signals using the peripheral antenna resonating element.

18. The electronic device defined in claim 1, wherein the antenna resonating element is formed on a support structure, the housing has a rear housing wall at the rear face, and the antenna resonating element is interposed between the support structure the rear housing wall.

19. An electronic device having opposing front and rear faces, comprising:
- a housing having a metal housing wall that forms an antenna ground for an antenna;
- a coil;
- wireless power receiver circuitry that uses the coil to receive wireless power signals through the rear face;
- radio-frequency transceiver circuitry coupled to the coil that is configured to transmit and receive signals using the coil as an antenna resonating element for the antenna; and
- a flexible printed circuit coupling the radio-frequency transceiver circuitry to the coil, wherein the antenna includes a positive feed terminal at the coil and a ground feed terminal at the metal housing wall coupled to the radio-frequency transceiver circuitry using the flexible printed circuit, and the flexible printed circuit is configured to route wireless power signals from the coil to the wireless power receiver circuitry.

* * * * *